3,103,528
IRON HYDROXIDE COMPLEXES AND PROCESS FOR THEIR PREPARATION
Frederick Maurice Tayler, Norton-on-Tees, England, assignor to Imperial Chemical Industries Limited, London, England, a corporation of Great Britain
No Drawing. Filed Jan. 11, 1960, Ser. No. 1,416
7 Claims. (Cl. 260—439)

This invention relates to new complex compounds which are ligand stabilised hydrides of transition metals.

Many metals do not form hydrides which are capable of existing as stable independent molecules. However, we have found that transition metals and ligands as hereinafter specified may exist in combination as stable complex compounds. A complex compound of this type has many of the properties which the corresponding free metal hydride would be expected to have; and therefore the formation of such a complex compound provides a method of effectively stabilising the metal hydride.

According to the present invention there are provided new compounds having a general formula $A_2B$, in which B is a hydride of a transition metal, at least one of the constituents designated by the symbol A has the structure XOR, in which X is an alkali metal, and R is a hydrocarbon group, and one of the constituents A may be an amine, a heterocyclic base, a substituted phosphine, a poly ether or a cyclic ether.

The said transition metal is preferably one which belongs to Group 7 or 8 of the periodic system. A particularly suitable transition metal is iron.

The said alkali metal may conveniently be lithium or sodium.

The said hydrocarbon group is preferably an alkyl group.

In the case where both constituents A have the structure XOR, the said constituents may conveniently be identical.

In the cases where one of the constituents A is an amine, a heterocyclic base, a substituted phosphine, a poly ether or a cyclic ether, this constituent may conveniently be respectively a lower aliphatic amine (e.g. propylamine), pyridine, triphenyl phosphine, di-(methoxyethyl) ether or dioxane.

Also according to the present invention there is provided a process for production of a compound of formula $(XOR)_2B$, in which B is a hydride of a transition metal, X is an alkali metal and R is a hydrocarbon group, which process comprises reacting, in a substantially chemically inert medium under anhydrous and anaerobic conditions, a compound of formula $M(OR)_n$, in which M is a transition metal, R is a hydrocarbon group and $n$ depends on the valency of the transition metal M, with an alkali metal hydride.

Suitable inert media for use in the process include, for example, diethyl ether and petroleum ether.

As an example of this process, lithium butoxy iron hydride may be produced by reaction between ferric butoxide and lithium hydride in diethyl ether.

The invention also provides a process for production of a compound of formula (XOR)AB, in which B, X and R are as hereinbefore defined and A is an amine, a heterocyclic base, a substituted phosphine, a poly ether or a cyclic ether, which process comprises reacting A and a compound of formula $(XOR)_2B$.

It will be appreciated that the term "hydride" is used in this specification to include a deuteride; and Example 5 illustrates the preparation of lithium butoxy iron deuteride.

Compounds according to the present invention find applications as reducing agents, and have the useful property of being soluble in organic solvents. As they may be decomposed fairly readily, they may also be used as sources of hydrogen.

EXAMPLE 1

A suspension of 19.8 gm. of lithium hydride in diethyl ether was prepared by means of a ball mill. The suspension was well stirred, and a solution of 136 gm. of ferric butoxide in about 50 ml. of diethyl ether was added dropwise to it. After the addition had been completed the resulting mixture was refluxed. After half an hour the mixture turned green. Refluxing was continued for a further two hours. The mixture was then cooled, and filtered, and the filtrate was evaporated to dryness. The product was recrystallised from diethyl ether, a yield of about 90 gm. being obtained. The whole preparation was carried out under strictly anhydrous and anaerobic conditions.

The product was a dark brown, apparently crystalline material which was readily hydrolysed in moist air. It was soluble in diethyl ether, petroleum ether, benzene, carbon tetrachloride and carbon disulphide. It reduced potassium permanganate, silver nitrate and iodine. It very rapidly reduced malachite green to a colourless material. It decomposed above 100° C. without melting. The product incandesces in oxygen. When finely divided it becomes very hot in the atmosphere, and ignites filter paper. It reacts vigorously with nitric acid.

It was found that one of the lithium butoxide groups contained in the molecule of the product could be displaced by propylamine, pyridine, triphenyl phosphine, di-(methoxyether) ether and dioxane.

The infra red spectrum of the product showed the presence of butoxy groups, the absence of hydroxyl groups, and a strong absorption band corresponding to a wave number of about 1600 cm.$^{-1}$. The material was paramagnetic. Solutions in diethyl ether and diethylamine were electrically non-conducting.

In the following table the observed quantitative analysis figures are compared with those calculated for a compound of formula $(LiOC_4H_9)_2FeH_5$, i.e. lithium butoxy iron hydride.

Table

| | Observed, percent | Calculated, percent |
|---|---|---|
| Li | 6.4 | 6.4 |
| Fe | 23.6 | 25.9 |
| C | 44.6 | 44.0 |
| Total H | 8.6 | 9.1 |
| Active H | 2.1 | 2.13 |

By "active H" is meant the metal hydride hydrogen, as distinct from the hydrogen present in the butoxy groups.

EXAMPLE 2

By a method similar to that described in Example 1 sodium butoxy iron hydride was prepared on a qualitative basis. The reaction was considerably slower than in the case of the preparation of lithium butoxy iron hydride. The product was readily hydrolysed by moist air.

EXAMPLE 3

A suspension of 0.96 gm. of lithium hydride in diethyl ether was prepared by means of a ball mill. The suspension was well stirred and a solution of 3.82 gm. of ferric ethoxide in diethyl ether was dripped into it. The resulting mixture was refluxed for 2½ hours, during which time it turned from light brown through dark green to black. The mixture was then cooled and filtered, and the filtrate was evaporated to dryness. The product, which was a dark brown solid, was recrystallised from diethyl ether, a yield of about 1 gm. being obtained. The whole preparation was carried out under strictly anhydrous and anaerobic conditions.

On analysis the recrystallised product was shown to have a Fe:Li:C atomic ratio of 1:1.9:4, which is consistent with the formula $(LiOC_2H_5)_2FeH_5$.

EXAMPLE 4

By a similar method to that described in Example 3 lithium methoxy iron hydride was prepared on a qualitative basis. The yield was lower than in the case of the preparation of lithium ethoxy iron hydride. The product was readily hydrolysed in moist air.

EXAMPLE 5

1 gm. of lithium deuteride was suspended in 100 ml. of diethyl ether at room temperature and under an argon atmosphere. A mixture of 6 gm. of ferric butoxide in 50 ml. of diethyl ether was added dropwise with stirring, over a period of half an hour. The resulting suspension, which was at first pale yellow, was refluxed for 9 hours, and its colour changed through green to very dark brown.

The resulting mixture was filtered through a No. 4 glass sinter filter and then refiltered three times through the pad of solids on the filter to remove suspended matter. On evaporation of the ether, 8 gm. of a dark brown crystalline solid, lithium butoxy iron deuteride, were isolated. The entire preparation was carried out under anhydrous and anaerobic conditions.

What is claimed is:

1. A compound of the formula $A_2B$ in which B is a hydride of iron, at least one of the constituents designated by the symbol A having the structure XOR, in which X is an alkali metal and R is lower alkyl, and any other constituent A is selected from the group consisting of lower alkyl amines, pyridine, triphenyl phosphine, di-(methoxyethyl) ether and dioxane.
2. The compound lithium butoxy iron hydride.
3. The compound lithium ethoxy iron hydride.
4. The compound lithium methoxy iron hydride.
5. The compound sodium butoxy iron hydride.
6. A process for the production of a compound of the formula $(XOR)_2B$ in which X is an alkali metal, R is lower alkyl and B is a hydride of iron which comprises bringing into contact a lower alkyloxide of iron and an alkali metal hydride in a substantially chemically inert medium and under substantially anhydrous and anaerobic conditions.
7. A process for the production of a compound of the formula (XOR)AB in which X is an alkali metal, R is lower alkyl, A is selected from the group consisting of propylamine, pyridine, triphenyl phosphine, di-(methoxyethyl) ether and dioxane and B is a hydride of iron, said method comprising bringing into contact a compound of the formula $(XOR)_2B$ in which X is an alkali metal, R is lower alkyl and B is a hydride of iron and a member of the group consisting of propylamine, pyridine, triphenyl phosphine, di-(methoxyethyl) ether and dioxane.

References Cited in the file of this patent

UNITED STATES PATENTS 2,494,968     Schlesinger et al. _____ Jan. 17, 1950

OTHER REFERENCES

Dumont et al.: "Chem. Ber.," volume 90, No. 6, pages 1054–1059, June 12, 1957. (See Chem. Abstracts, volume 52, 10871 g.)